(12) United States Patent
Prince et al.

(10) Patent No.: US 8,515,383 B2
(45) Date of Patent: Aug. 20, 2013

(54) UTILITY POWERED COMMUNICATIONS GATEWAY

(75) Inventors: Christopher Terry Prince, Rosewell, GA (US); Bradley Richard Ree, Cumming, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/293,222

(22) Filed: Nov. 10, 2011

(65) Prior Publication Data

US 2013/0121384 A1  May 16, 2013

(51) Int. Cl.
*H04M 9/00* (2006.01)

(52) U.S. Cl.
USPC ............ 455/402; 370/328; 370/338; 370/311

(58) Field of Classification Search
USPC ................. 455/402, 400; 370/311, 485–487, 370/328–338
See application file for complete search history.

(56) References Cited

U.S. PATENT DOCUMENTS

| | | |
|---|---|---|
| 6,747,571 B2 | 6/2004 | Fierro et al. |
| 7,091,853 B2 | 8/2006 | Pfleging et al. |
| 7,714,742 B1 | 5/2010 | Noworolski et al. |
| 7,773,555 B1 | 8/2010 | Johnson |
| 8,014,329 B2 | 9/2011 | Gong |
| 2008/0068994 A1* | 3/2008 | Garrison Stuber et al. ... 370/230 |
| 2009/0135836 A1* | 5/2009 | Veillette ........................ 370/400 |
| 2011/0035510 A1 | 2/2011 | Alexander |
| 2011/0046792 A1 | 2/2011 | Imes |
| 2011/0202189 A1 | 8/2011 | Venkatakrishnan |

FOREIGN PATENT DOCUMENTS

WO  WO 2011052956 A2  5/2011

OTHER PUBLICATIONS

Search Report and Written Opinion for corresponding European Application 12192075.5-2416, dated Jan. 28, 2013.
Arpan Pal et al., "Energy Information Gateway for Home", Intelligent Systems, Modelling and Simulation (ISMS), 2011 Second International Conference on IEEE, Jan. 25, 2011, pp. 235-240, XP031930770, ISBN: 978-1- 4244-9809-3.
Zubair MD Fadlullah et al., "Towar intelligent machine-to-machine communications in smart grid", IEEE Communications Magazine, vol. 49, No. 4, Apr. 1, 2011, pp. 60-64-5, XP011372659, ISSN: 0163-6804.

* cited by examiner

*Primary Examiner* — Chuong A Ngo
(74) *Attorney, Agent, or Firm* — Fletcher Yoder, P.C.

(57) ABSTRACT

Described herein are embodiments of methods, systems and devices of providing a communications gateway between one or more first networks and a second network. In accordance with one aspect, a method is provided comprising receiving, by a first device, information communicated from one or more first networks, wherein the first device is a low power device; and transmitting, by a second device, at least part of the information over a second network, wherein the second device is a high power device and wherein the first device and the second device receive power from a wired communications system.

30 Claims, 5 Drawing Sheets

UTILITY POWERED COMMUNICATIONS GATEWAY

FIELD OF THE INVENTION

This invention generally relates to utility communications, and in particular, to systems, methods, and apparatus for providing a gateway for communications between one or more first networks and a second network.

BACKGROUND OF THE INVENTION

The increasing demand for energy and the use of finite resources for energy production have led to the use of increased technology for the production, transmission, distribution and consumption of energy in order to make, distribute and use energy more efficiently and wisely. To that end, utility service providers have begun employing information technology systems integrated with their energy production, transmission, distribution and metering systems to enable more efficient monitoring and operation of such systems. Concurrently, vendors and manufacturers have also begun employing similar technology in products and devices that consume electricity, such as appliances (e.g., refrigerators, washing machines and dryers, dishwashers, HVAC systems, lighting systems, stoves, water heaters, etc.) and electronics (e.g., televisions, stereos, computers, etc.). These efforts are often broadly categorized as smart grid, smart meter and smart appliance or smart device technologies.

The smart grid marries information technology with the current electrical infrastructure. The smart grid is, in essence, an "energy Internet," delivering real-time energy information and knowledge—empowering smarter energy choices. Roles for the smart grid include enabling the integration and optimization of more renewable energy (such as wind and solar); driving significant increases in the efficiency of the electrical network; and, empowering consumers to manage their energy usage and save money without compromising their lifestyle.

Smart grid technologies provide utilities and consumers with real-time knowledge and decision-making tools that empowers them to save energy, resources, money, and the environment. The smart grid is not a singular product, but rather a collection of hardware and software that works together to make today's electrical grid more intelligent. Similar to how the Internet turned a disaggregated collection of computers into a more powerful tool, overlaying the current power infrastructure with smart grid technology is like connecting the Internet to the computer, making an already useful machine much better and providing people with information to make intelligent decisions. Similarly, the smart grid, or the "energy Internet," empowers consumers, businesses and utilities to make smarter energy choices.

Smart grid components include automation software and intelligent electronic hardware systems that control the transmission and distribution grids. Smart grid automation technologies—such as energy management systems and distribution management systems—help provide real-time knowledge and control over the distribution and transmission grids. On the transmission side, Energy Management Systems (EMS) provide real-time information on the grid's status, helping utilities automate various grid functionalities remotely. This automation technology helps utilities choose the best, most affordable generation mix (known as economic dispatch), keeping costs lower for consumers and businesses; reduce losses and waste in the delivery of power to drive a more efficient system; and maintain system reliability to help ensure a steady supply of power to customers. Distribution Management System (DMS) comprises the smart grid automation technology that provides utilities with real-time information about the distribution network and allows utilities to remotely control switches in the grid. The DMS is the heart of a smarter distribution grid; enabling utilities to manage distributed renewable generation, support grid efficiency technologies, and control the isolation and restoration of outages. Without DMS, the utility gets very little real-time information about the distribution grid and can't realize many of the benefits of a smarter grid.

Furthermore, smart grid technologies can extend beyond the electrical grid. With smart grid technologies in the home—like smart meters, smart energy panels, and smart appliances—consumers can have access to more accurate data and knowledge about electricity pricing, helping them save money and lower their environmental footprint.

Currently, most power companies offer one set price for electricity throughout the day, regardless of how expensive it is to produce. Most consumers don't know that it costs much more to produce energy during the peak hours of the day—typically between 2 p.m. and 7 p.m.—than it does at any other time. A smart meter can communicate time of use pricing via smart home energy panels or other display devices to help consumers make smarter energy choices throughout the day. Consumers will be more likely to use high-consuming devices during off-peak pricing periods, when electricity prices are cheaper. With smart meters, buying electricity is like buying other consumer goods—with price impacting purchase decision. For example, a consumer can choose to have their house pre-cooled before arriving home to ensure the air conditioning system can remain off during expensive peak pricing hours, without impacting the consumer's comfort level. A consumer can also have their water pre-heated to avoid peak prices and lower their energy bill. A year-long study by the U.S. Department of Energy showed that real-time pricing information provided by the smart meter helped consumers reduce their electricity costs 10% on average and their peak consumption by 15%.

Smart meters can also enable consumers to pre-pay their electricity bill and help utilities better detect and manage outages. Smart meters coupled with advanced metering infrastructure (AMI) helps pinpoint problems on the grid, allowing utilities to determine exactly which customers are without power. Compare this to today, when many utilities still wait for customer calls to notify them of outages.

Smart appliances can work in concert with smart meters and the smart grid to avoid peak-hour energy use and top-tier pricing-without any negative impact on the consumer-by adapting to price signals from the utility. For example, a dryer may automatically switch from high heat to "fluff" if electricity hits a certain per-kilowatt-hour rate—even if the homeowner is at work. Or, the automatic defrost on a refrigerator can delay itself until a time of reduced electricity rates. If the freezer delays the defrost cycle until after peak energy hours, consumers pay less for the same amount of energy. There are countless ways to conserve energy and save money when smart appliances are coupled with smart meters and time-of-use pricing information including, for example, updating software or firmware of a smart appliances using the smart grid and smart meter infrastructure. The smart grid, smart meter and smart appliance technologies enable utilities to communicate (duplex) with smart appliances in the home. This ability creates opportunities beyond that of energy management.

For example, in some instances a meter (e.g., a "smart meter") can acts as an energy service portal (ESP), which provides a connection between a second network (e.g., the network between the head end server and the meter), and a first network (e.g., the network between the devices within the home and the meter). However, this requires each meter to have devices configured to communicate with both, the first and second networks.

The first network receives its messages from the head end server of the second network, or a demand response management system (DRMS). DRMS are mechanisms to manage customer consumption of electricity in response to supply conditions, for example, having electricity customers reduce their consumption at critical times or in response to market prices. DRMS involves messages sent to demand response mechanisms that respond to these explicit requests to shut off Demand response can involve actually curtailing power used or by starting on site generation which may or may not be connected in parallel with the grid. Demand response is a component of smart energy demand, which also includes energy efficiency, home and building energy management, distributed renewable resources, and electric vehicle charging. Current demand response schemes are implemented with large and small commercial as well as residential customers, often through the use of dedicated control systems to shed loads in response to a request by a utility or market price conditions. Services (lights, machines, air conditioning) are reduced according to a preplanned load prioritization scheme during the critical time frames. An alternative to load shedding is on-site generation of electricity to supplement the power grid. Under conditions of tight electricity supply, demand response can significantly decrease the peak price and, in general, electricity price volatility.

Demand response is generally used to refer to mechanisms used to encourage consumers to reduce demand, thereby reducing the peak demand for electricity. Since electrical generation and transmission systems are generally sized to correspond to peak demand (plus margin for forecasting error and unforeseen events), lowering peak demand reduces overall plant and capital cost requirements. Depending on the configuration of generation capacity, however, demand response may also be used to increase demand (load) at times of high production and low demand. Some systems may thereby encourage energy storage to arbitrage between periods of low and high demand (or low and high prices).

These messages, which can be DRMS requests, are passed over the second network, to the meter, into the home and to the devices via the second network. When a load control message, pricing information, display message, or other types of messages need to be sent to a device in the home, the head end server will send a message to each device in the home which requires the data. Also, when the device in the home participates in the event, the device will send a message to the server. Because of the need to communicate with both networks, the meters are required to include devices configured for communications with each network, which can be expensive and redundant. Furthermore, isolated power supplies are required in the meters to isolate the power used by these communication devices from metered power.

Therefore, methods, systems and devices are desired that overcomes challenges in the art, some of which are described above, to provide a gateway for communications between one or more first networks and a second network.

BRIEF DESCRIPTION OF THE INVENTION

In accordance with one aspect, a method is provided comprising receiving, by a first device, information communicated from one or more first networks, wherein the first device is a low power device; and transmitting, by a second device, at least part of the information over a second network, wherein the second device is a high power device and wherein the first device and the second device receive power from a wired communications system.

In accordance with another aspect, a communications gateway is described for providing communications between one or more first networks and a second network. One embodiment of the communications gateway is comprised of: a first device, wherein the first device is configured to transmit or receive information over one or more first networks and the first device is a low power device; a second device, wherein the second device is configured to transmit or receive information over a second network and the second device is a high power device; a processor, wherein the processor is operably connected to the first device and the second device and the processor is configured to process the information received or transmitted by the first or second devices; and a power supply, wherein the power supply receives power from a wired communications system and supplies power to the first device, the second device and the processor.

In accordance with yet another aspect, a communications gateway is described for providing communications between one or more first networks and a second network. One embodiment of the communications gateway is comprised of: a wireless IEEE Standard 802.15.n (Zigbee) low power transceiver, wherein the Zigbee transceiver is configured to transmit or receive information over one or more home-area networks (HANs); a wireless advanced metering infrastructure (AMI) high power transceiver, wherein the AMI transceiver is configured to transmit or receive information over an AMI network; a processor, wherein the processor is operably connected to the Zigbee transceiver and the AMI transceiver and the processor is configured to process the information received or transmitted by the Zigbee transceiver or AMI transceiver; and a power supply, wherein the power supply receivers power from a wired communications system and supplies power to the Zigbee transceiver, the AMI transceiver and the processor.

In accordance with yet another aspect, a method is provided comprising measuring consumption of a commodity; transmitting consumption data using a low power transmitter; receiving the consumption data from the low power transmitter; and transmitting the consumption data using a high power transmitter, wherein power is provided to the high power transmitter from a wired communications system.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3 illustrates an exemplary database that can be used to associate a unique device identifier with one or more characteristics of devices that are operably connected with the identified energy portal via the second network;

DETAILED DESCRIPTION OF THE INVENTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Smart appliances are appliances that can be programmed to operate when it is most cost effective to do so based on time-of-use pricing signals from the utility. For example, a smart refrigerator would only enable the defrost cycle to occur when electricity prices are lowest, without compromising a consumer's lifestyle. In some instances, smart appliances are programmed or otherwise receive communications over networks, and can communicate with other computing devices and smart appliances over these networks. Smart devices such as programmable thermostats and water heater controls are configured to communicate with other computing devices, other smart devices, smart appliances and smart meters over one or more networks. Herein, smart appliances and smart devices will be referred to as "smart devices" or just "devices." Smart meters are among the fundamental building blocks of smart grid deployments. They track and report energy usage by time of day, enabling utilities to charge less for electricity used during off-peak hours. As a result, consumers can choose to shift energy-intensive activities to times when rates are lower to save on energy costs. In general, smart devices can be configured to communicate with a smart meter and smart meters are configured to communicate with the smart grid. Generally, these communications are duplex. Because of the expected proliferation of smart devices, networks that handle the communication between the device, the meters and the smart grid may become burdened with the amount of traffic. Therefore, embodiments described herein provide methods, systems and devices for reducing the traffic on these networks.

Figure 1:
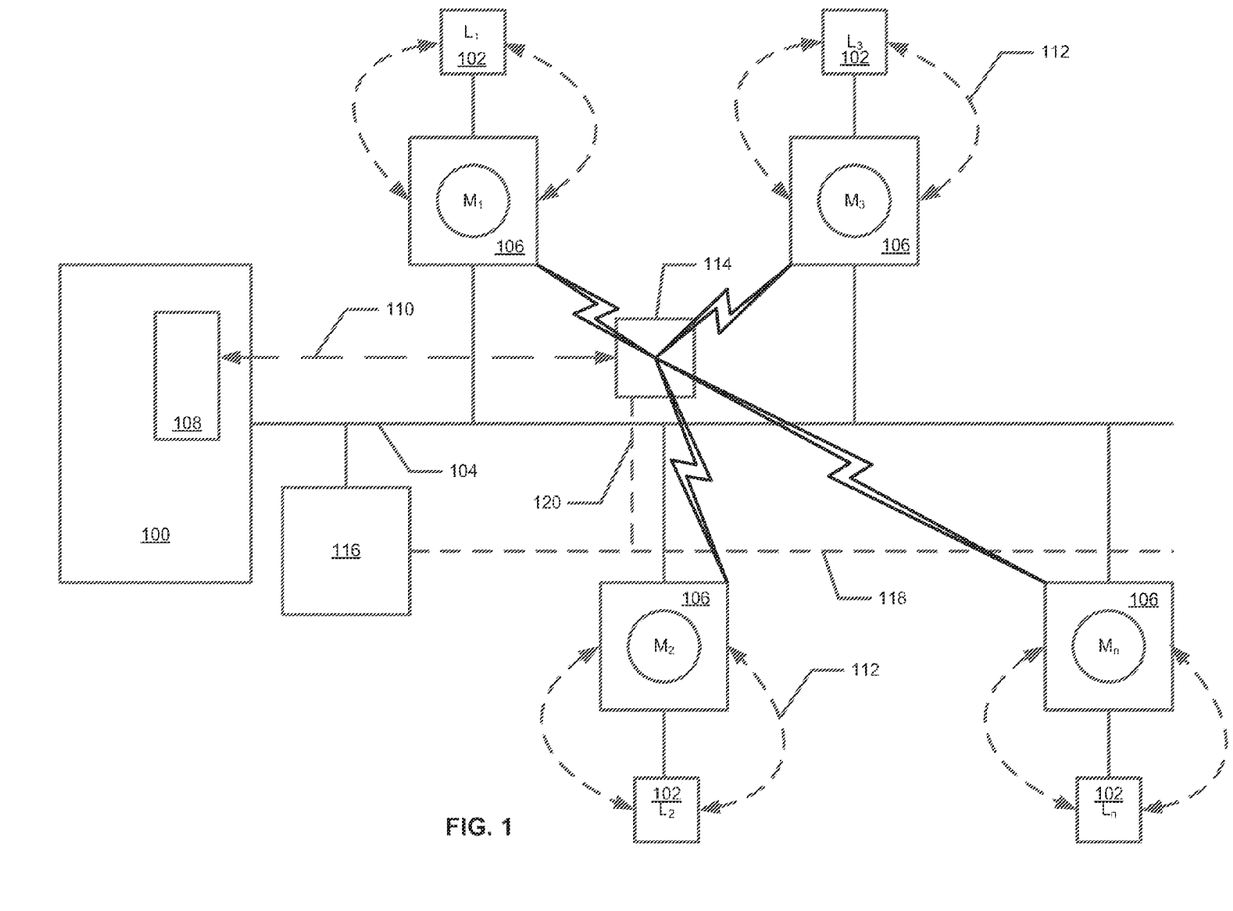
FIG. 1 is a block diagram of a section of an exemplary utility distribution system.

Referring to FIG. 1, an illustration of one type of system that would benefit from embodiments of the present invention is provided. FIG. 1 is a block diagram of a section of an exemplary utility distribution system such as, for example, an electric distribution system. As shown in FIG. 1, a utility service is delivered by a utility provider 100 to various loads $L_1$-$L_n$, 102 through a distribution system 104. In one aspect, the utility service provided is electric power. Consumption of the utility service by the loads 102 is measured at the load locations by meters $M_1$-$M_n$ 106. If an electric meter, the meter 106 can be single-phase or poly-phase electric meters, as known to one of ordinary skill in the art, depending upon the load 102. In one aspect, the electric meter 106 is a smart meter as described herein and as known to one of ordinary skill in the art. In one aspect, the meter 106 can act as an energy portal. An energy portal is a device or software that can be used to communicate with one or more devices within a home or at a location regarding energy consumption of the devices. For example, an energy portal can receive consumption information from a device and pass that information on to a utility 100. Similarly, an energy portal can receive communications from a utility 100 and cause on or more devices to shut down or to reduce their load. In addition to the meter 106 described herein, an energy portal can also be a computer, processor, stand-alone device, and the like. Hereinafter, the specification will refer to an "energy portal" as a "meter," "electric meter," and/or "smart meter," where the terms can be used interchangeably, though it is to be appreciated that an energy portal is not limited to a meter and that a meter is only one example of an energy portal. One non-limiting example of a smart meter is the GE I210+c meter as available from General Electric Company (Schenectady, N.Y.). In one aspect, the meter 106 can be configured to communicate via a second network (not shown in FIG. 1) with the loads 102. In one aspect, the meter 106 can be configured to communicate with the loads 102 or other devices using, for example, a network such as a home area network (HAN) 112. The HAN 112 can be wired (including fiber optic) or wireless, or combinations thereof, and use protocols such as those described in IEEE Standard 802.15 and any modifications thereof (e.g. 802.15.n), also known as Zigbee™; IEE Standard 802.11 and any modifications thereof (e.g., 802.11n), also known as WiFi™; power line carrier (PLC); broadband over powerline (BPL); and the like. In one aspect, the loads 102 can be devices such as smart appliances, as described herein and as known to one of ordinary skill in the art. Smart appliances are available from vendors or manufacturers such as, for example, General Electric Company, Whirlpool Corporation (Benton Harbor, Mich.), LG Electronics USA (Englewood Cliffs, N.J.), among others. While consumption information is used by the utility provider 100 primarily for billing the consumer, it also can be used for other purposes including planning and profiling the utility distribution system. In many instances, meters 106 are still read by hand, which can be costly, inefficient and error-prone. In some instances, utility providers 100 desire to electronically communicate with the meters 106 for numerous purposes including scheduling disconnection or connection of utility services to the loads 102, automatic meter reading (AMR), load shedding and load control, automatic distribution and smart-grid applications, outage reporting, providing additional services such as Internet, video, and audio, etc. In many of these instances, the meters 106 can be configured to communicate with one or more computing devices 108 through a communications network 110, which can be wired, wireless or a combination of wired and wireless, as known to one of ordinary skill in the art. In one aspect, the communications network 110 can comprise at least part of a smart grid network.

Further comprising the system of FIG. 1 is a communications gateway 114. As shown in FIG. 1, the communications gateway 114 can be located such that is can communicate with one or more of the HANs 112. For example, the communications gateway 114 can be located on a utility pole (not shown) near several homes or buildings such that the HAN 112 associated with each home or building can communicate with the communications gateway 114. Though the communications gateway 114 is shown in FIG. 1 as communicating wirelessly with the HANs 112, it is to be understood that the communications gateway 114 can communicate in any way with the HANs 112 including wired (including fiber optic), wirelessly or a combination thereof. In one aspect, the communications gateway 114 can receive information from a low power transmitter in the HAN. For example, the low power transmitter can be a Zigbee, WiFi or the like transmitter. The information can be, for example, consumption information about a commodity. For example, the consumption information can be related to the amount of electrical energy consumed by a house, building or a particular device. The communications gateway 114 also can be configured to communicate with the one or more computing devices 108 through a communications network 110. For example, a transmitter in the communications gateway 114 can transmit consumption information that has been received from one or more of the low power transmitters of the HANs 112 to the computing device 108. In one aspect, this can be transmitted using a high-power transmitter (relative to the low power transmitter used to transmit the consumption information to the gateway 114). Generally, as used herein, "low power" means that a device is configured to receive or transmit a signal having a lower signal strength relative to a high power device; therefore having a smaller range than a high power device. Similarly, "high power" means that a device is configured to receive or transmit a signal having a higher signal strength relative to a low power device; therefore having a greater range than a low power device. The high-power transmitter can be, for example, an advanced metering infrastructure (AMI) transmitter. Further comprising the system of FIG. 1 is a communications provider 116. For example, the communications provider 116 can be a provider of one or more of television services, Internet services, telephone services, and the like. In one aspect, the communications provider 116 is a wired communications provider using, for example, coaxial cable, fiber optic cable, twisted-pair cable, and the like 118 to provide communication services to users. In many instances, the wired communications provider includes electrical power wiring that accompanies or is incorporated into the coaxial cable, fiber optic cable, twisted-pair cable, and the like 118. This power wiring is used for powering electrical devices that are connected to the coaxial cable, fiber optic cable, twisted-pair cable, and the like 118, or it can be used for signaling purposes along the wired communications system. This power wiring 120, in one aspect, can be used to provide power to the communications gateway 114. In one aspect, power wiring 120 can be used to provide power to the high power transmitter of the communications gateway 114. One non-limiting example is of the communications gateway 114 being located on a utility pole and using power wiring from a cable television provider's coaxial cable that is also connected to the same pole to provide electrical power to the communications gateway 114.

Figure 2:
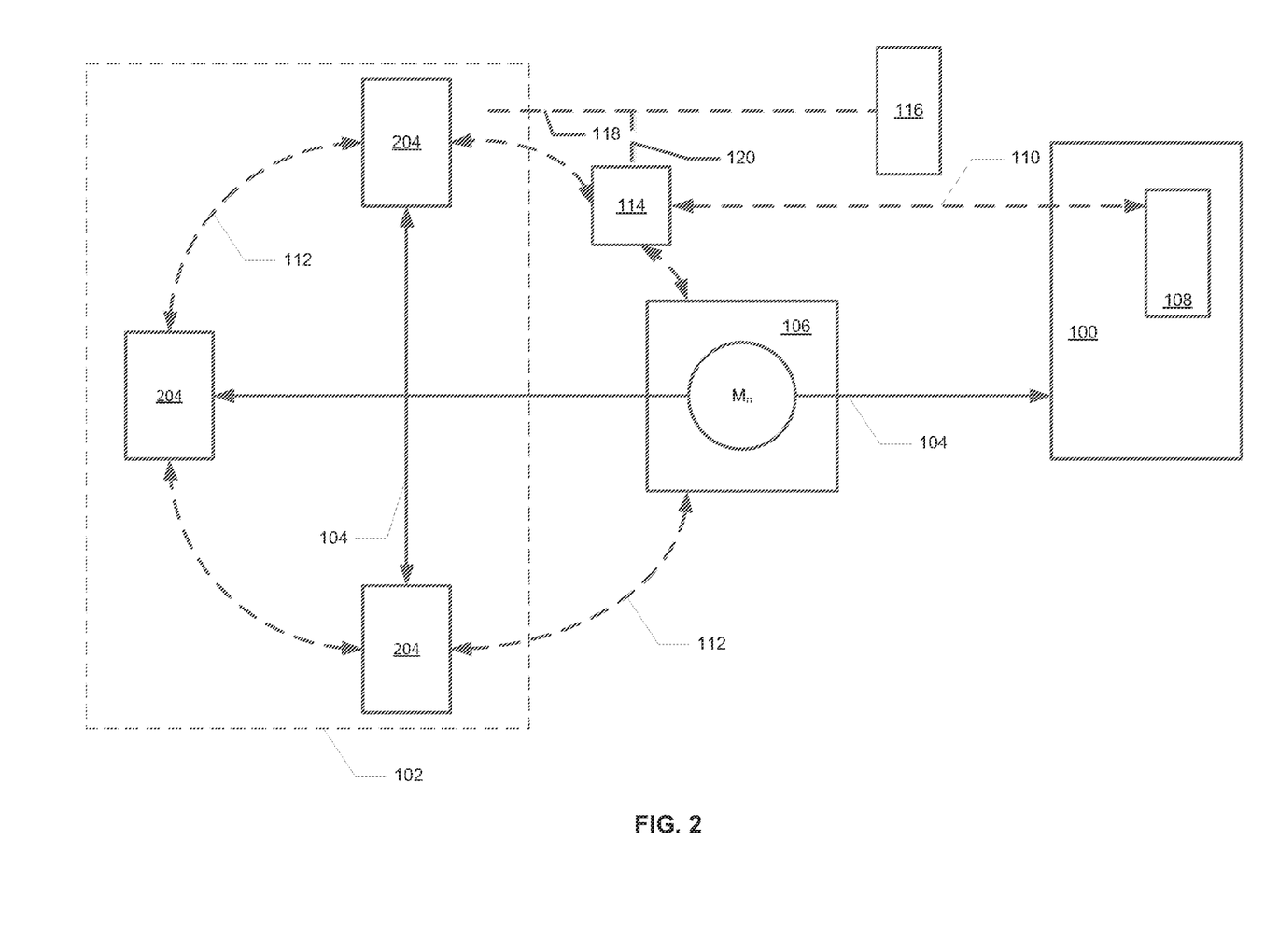
FIG. 2 is an exemplary illustration of an embodiment of a communications gateway configured to communicate with one or more appliances or devices and a meter over a first network and configured to communicate with a computing device over a second network.

In one aspect, the communications gateway 114 can be configured to receive information communicated from the one or more HANs 112, and transmit at least part of the information over the communications network 110 a second network, wherein the communications gateway 114 receives power from a wired communications system such as a cable television system, a cable Internet system, a telephone system, and the like FIG. 2 is an exemplary illustration of an embodiment of a communications gateway 114 configured to communicate with one or more appliances or devices 204 and meter 106 over a first network 112 and configured to communicate with a computing device 108 over a second network 110. In one aspect, the devices 204 are smart appliances and smart devices as described herein and as known to one of ordinary skill in the art. As used herein, the specification will refer to a device 204 as an "appliance," a "smart appliance," a "smart device" and/or a "device," where the terms can be used interchangeably. As shown in FIG. 2, a first network 112 (e.g., a HAN) is used to communicate between one or more smart appliances or devices 204, the meter 106, and the communications gateway 114. In one aspect, one or more devices 204 comprise at least a portion of the load 102 as referenced in FIG. 1, and can form a network 112 that communicates with the meter 106 and the communications gateway 114. The meter 106 also measures consumption of the utility service (e.g., electric power) as provided by the distribution system 104. In one aspect, low power transmitters associated with one or more devices 204 or the meter 106 that comprise the first network 112 transmit information such as consumption data to the communications gateway 114. Furthermore, the communications gateway 114 is configured to communicate over a second network 110. In one aspect, the communications gateway 114 can communicate with at least a computing device 108 via the second network 110. In one aspect, the communications gateway 114 is operably connected to the first network 112. In one aspect, the communications gateway 114 can receive information from a device 204 operably connected to the first network 112 via the first network 112. For example, the device 204 can be configured to transmit registration information when it is first plugged in or installed or to transmit consumption information. The registration information, consumption data, device characteristics, and any other information can be transmitted to or from the communications gateway 114 from the device 204 via the network 112 using one or more of a WPAN (e.g., ZigBee, Bluetooth), LAN/WLAN (e.g., 802.11n, microwave, laser, etc.), WMAN (e.g., WiMAX, etc.), WAN/WWAN (e.g., UMTS, GPRS, EDGE, CDMA, GSM, CDPD, Mobitex, HSDPA, HSUPA, 3G, etc.), RS232, USB, Firewire, Ethernet, wireless USB, cellular, HAN, OpenHAN, power line carrier (PLC), broadband over power lines (BPL), and the like.

Information can be transmitted to or from the computing device 108 from the communications gateway 114 via the second network 110 that can be comprised of one or more of a WPAN (e.g., ZigBee, Bluetooth), LAN/WLAN (e.g., 802.11n, microwave, laser, etc.), WMAN (e.g., WiMAX, etc.), WAN/WWAN (e.g., UMTS, GPRS, EDGE, CDMA, GSM, CDPD, Mobitex, HSDPA, HSUPA, 3G, etc.), RS232, USB, Firewire, Ethernet, wireless USB, cellular, HAN, OpenHAN, power line carrier (PLC), broadband over power lines (BPL), and the like. In one aspect, a high power transmitter such as an AMI radio can be used to transmit information to the computing device 108 via the second network 110. In one aspect, power for the high power transmitter is provided by a wired communications system. In one aspect, the second network 110 comprises at least a portion of a smart grid network. In one aspect, the second network 110 comprises an advanced metering infrastructure (AMI). AMI refers to systems that measure, collect and analyze energy usage, and interact with advanced devices such as electricity meters, gas meters, water meters, and the like through various communication media either on request (on-demand) or on pre-defined schedules. This infrastructure includes hardware, software, communications, consumer energy displays and controllers, customer associated systems, meter data management (MDM) software, supplier and network distribution business systems, and the like. The network 110 between the measurement devices (e.g., meters 106), communications gateways 114, and business systems allows collection and distribution of information to customers, suppliers, utility companies and service providers. This enables these businesses to either participate in, or provide, demand response solutions, products and services. By providing information to customers, the system assists a change in energy usage from their normal consumption patterns, either in response to changes in price or as incentives designed to encourage lower energy usage use at times of peak-demand periods or higher wholesale prices or during periods of low operational systems reliability.

In one aspect, the communications gateway 114 can receive, over the second network 110, a message for a device 204 on the first network 112. In one aspect, the message can comprise at least one device characteristic such as, for example, load control, pricing and messaging. In one aspect, the message can include one or more of an address for the communications gateway 114 to receive the message, a device type for the devices 204 to be affected, and an address for a device 204 on the first network 112. For example, the first network 112 can be a HAN and the single message can include one or more of an address for the communications gateway 114 to receive the message, a HAN device type for the devices 204, and a HAN address. In one aspect, the message is transmitted by the computing device 108 over the network 110 to the communications gateway 114. A processor within the communications gateway 114 can determine one or more devices 204 associated with the at least one device characteristic, wherein each of the one or more devices 204 are connected to the first network 112.

Figure 3:
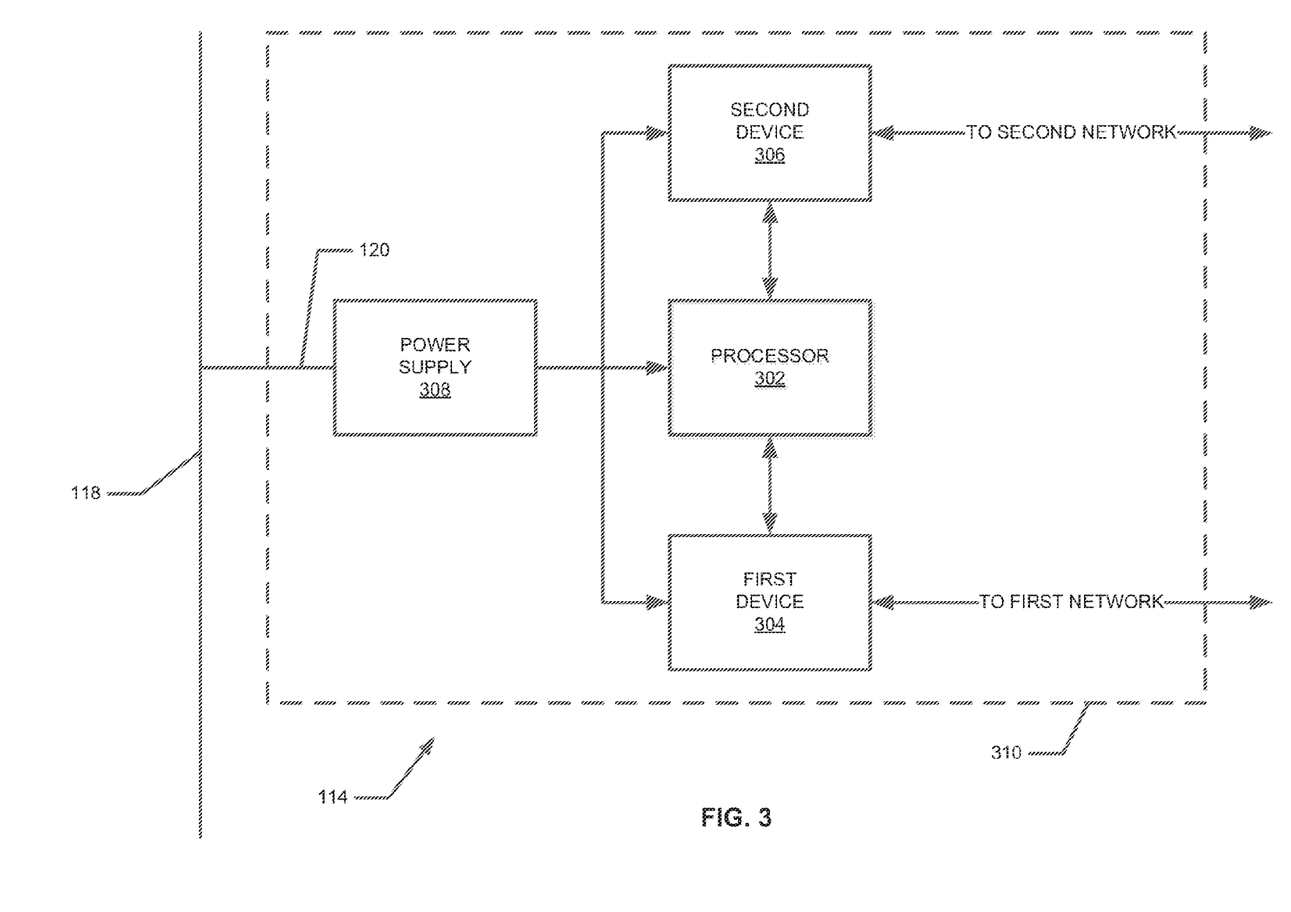
FIG. 3 illustrates an embodiment of an entity capable of operating as a communications gateway that can be configured to communicate with smart appliances and devices over a first network and with a computing device over a second network.

FIG. 3 illustrates an embodiment of an entity capable of operating as a communications gateway 114 that can be configured to communicate with smart appliances and devices 204 over a first network 112 and with a computing device 108 over a second network 110. The entity capable of operating as a communications gateway 114 includes various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as a communications gateway 114 can generally include means, such as one or more processors 302 for performing or controlling the various functions of the entity. As shown in FIG. 3, in one embodiment, communications gateway 114 can comprise a first device 304. The first device 304 can comprise a wired (including fiber optic) or wireless receiver or transceiver for communicating with the one or more first networks 112. In one aspect, the first device 304 can comprise a wireless receiver configured to receive information communicated from the one or more first networks 112. In another aspect, the first device 304 can comprise a wireless transceiver configured to receive information communicated from the one or more first networks 112 and to transmit information and instructions to the one or more first networks 112. It is to be appreciated that the first device 304 can be configured to communicate with a plurality of first networks 112. Generally, the first device 304 is a low power wireless device such as, for example, an IEEE Standard 802.15.n (Zigbee) receiver or transceiver that can communicate with one or more first networks 112 within range of its radio frequency signal. As noted herein, the one or more first networks 112 generally comprise one or more WPANs. In one aspect, the one or more first networks 112 comprise one or more HANs.

Further comprising the embodiment of a communications gateway 114 as shown in FIG. 3 is a second device 306. The second device 306 is configured to transmit or receive information over a second network. In one aspect, the second device 306 is configured to communicate over a wired medium such as coaxial cable, twisted pair cable, fiber optic cable, and the like. In another aspect, the second device 306 comprises a wireless transceiver. In one aspect, the second device 306 comprises a wireless advanced metering infrastructure (AMI) radio transceiver. Generally, the second device 306 is a high power device relative to the first device 304 (i.e., it has a much higher signal strength than a low power device). The processor 302 of the embodiment of a communications gateway 114 is operably connected to the first device 304 and the second device 306. The processor 302 is configured to process the information received or transmitted by the first 304 or second devices 306. A power supply 308 provides electrical power needed by the communications gateway 114 including supplying power to the first device 304, the second device 306 and the processor 302. The power supply 308 receives power through an electrical connection 120 with a wired communications system 118 such as a cable television system, a cable Internet system, a telephone system, and the like. Though not shown in FIG. 3, in one aspect the communications gateway can further comprise a memory that is operably connected or integrated into the processor 302, such as volatile and/or non-volatile memory that stores content, data or the like. For example, the memory may store content transmitted from, and/or received by, the entity. Also, for example, the memory may store software applications, instructions or the like for the processor 302 to perform steps associated with operation of the entity in accordance with embodiments of the present invention. In one aspect, the communications gateway 114 can include can enclosure 310. The enclosure 310 can be used to mount the communications gateway 114 and also to protect the components that comprise the communications gateway 114 from the elements and harsh environment. In one aspect, the enclosure 310 can be a weatherproof enclosure such as a National Electrical Manufacturer's Association (NEMA) Class 4 enclosure. In other aspects, the components that comprise the communications gateway 114 can be located within preexisting equipment enclosures or integrated into other devices.

Figure 4A:
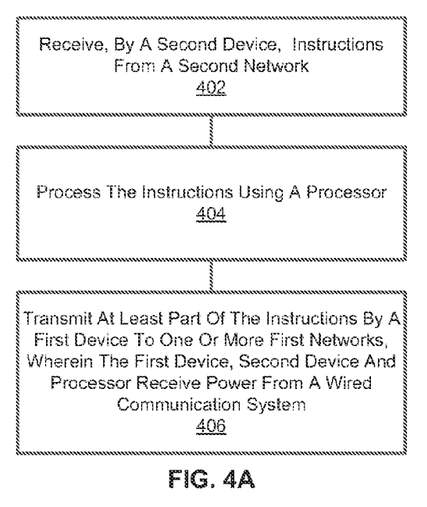
FIGS. 4A and 4B are flowcharts illustrating operations that may be taken for providing communications functionality using a communications gateway according to an embodiment of the present invention.
Figure 4B:
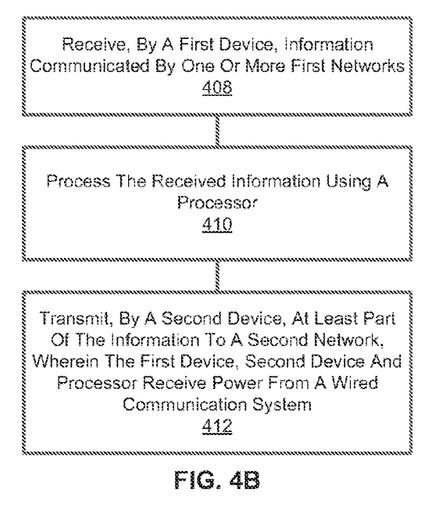

Referring now to FIGS. 4A and 4B, the operations are illustrated that may be taken for providing communications functionality using a communications gateway 114. In one aspect, the communications gateway 114 can be configured to (Step 402) receive, by the second device 306, instructions via the second network At Step 404, the instructions are processed using the processor 302. At Step 406, at least part of the instructions are transmitted by the first device 304 to one or more of the one or more first networks, wherein the communications gateway 114 receives power from a wired communication system. Generally, the second device is a high power device relative to the first device. Referring now to FIG. 4B, the communications gateway 114 can be configured to (Step 408) receive, by the first device 304, information communicated by one or more of the one or more first networks. At Step 410, the received information is processed using the processor 302, and at Step 412, at least part of the information is transmitted, by the second device 306, to the second network, wherein the communications gateway 114 receives power from a wired communication system. In one aspect, the one or more first networks comprise home-area networks (HANs). In various aspects, the HANs can utilize one or more of an IEEE Standard 802.15.n (Zigbee), 802.11n (WiFi), power line carrier (PLC), or broadband over power line (BPL) when communicating with the first device 304. In one aspect, the second network 110 can comprise an advanced metering infrastructure (AMI) network. In one aspect, the wired communications system 118 can comprise one of a cable television system, a cable Internet system, a telephone system, and the like. In one aspect, the first device 304 comprises a wireless receiver such as an IEEE Standard 802.15.n (Zigbee) receiver. In one aspect, the first device 304 comprises a wireless transceiver such as an IEEE Standard 802.15.n (Zigbee) transceiver. In one aspect, the second device 306 can comprise a wireless advanced metering infrastructure (AMI) radio transceiver. Generally, the first device is a low power device relative to the second device.

Figure 4C:
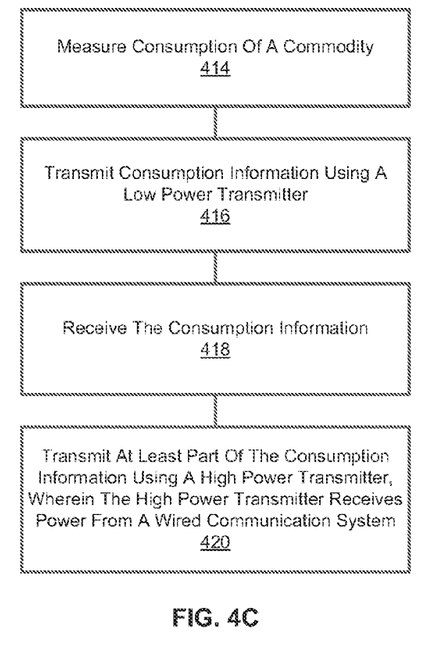
FIG. 4C is an alternative embodiment of a flowchart illustrating the operations that may be taken for providing communications functionality using a communications gateway.

FIG. 4C is an alternative embodiment of a flowchart illustrating the operations that may be taken for providing communications functionality using a communications gateway 114. At Step 414, consumption of a commodity is measured. For example, this consumption information can be related to electricity used by a home or device, water consumption by a home or business, natural gas consumption, and the like. Generally, consumption is measured by a meter. At Step 416, the consumption information is transmitted using a low power transmitter. For example, the low power transmitter can comprise a Zigbee transmitter, a WiFi transmitter, and the like. At Step 418, the consumption information is received. Generally, this consumption information will be received by a receiver matching the low power transmitter that transmitted the information. For example, if a Zigbee transmitter transmitted the information, it will generally be received by a Zigbee receiver. At Step 420, at least part of the consumption information is transmitted using a high power transmitter, wherein the high power transmitter receives operating power from a wired communications system. This high power transmitter can be, for example, an AMI radio, power line carrier, broadband over powerline, and the like. In one aspect, the wired communications system 118 can comprise one of a cable television system, a cable Internet system, a telephone system, and the like.

Figure 5:
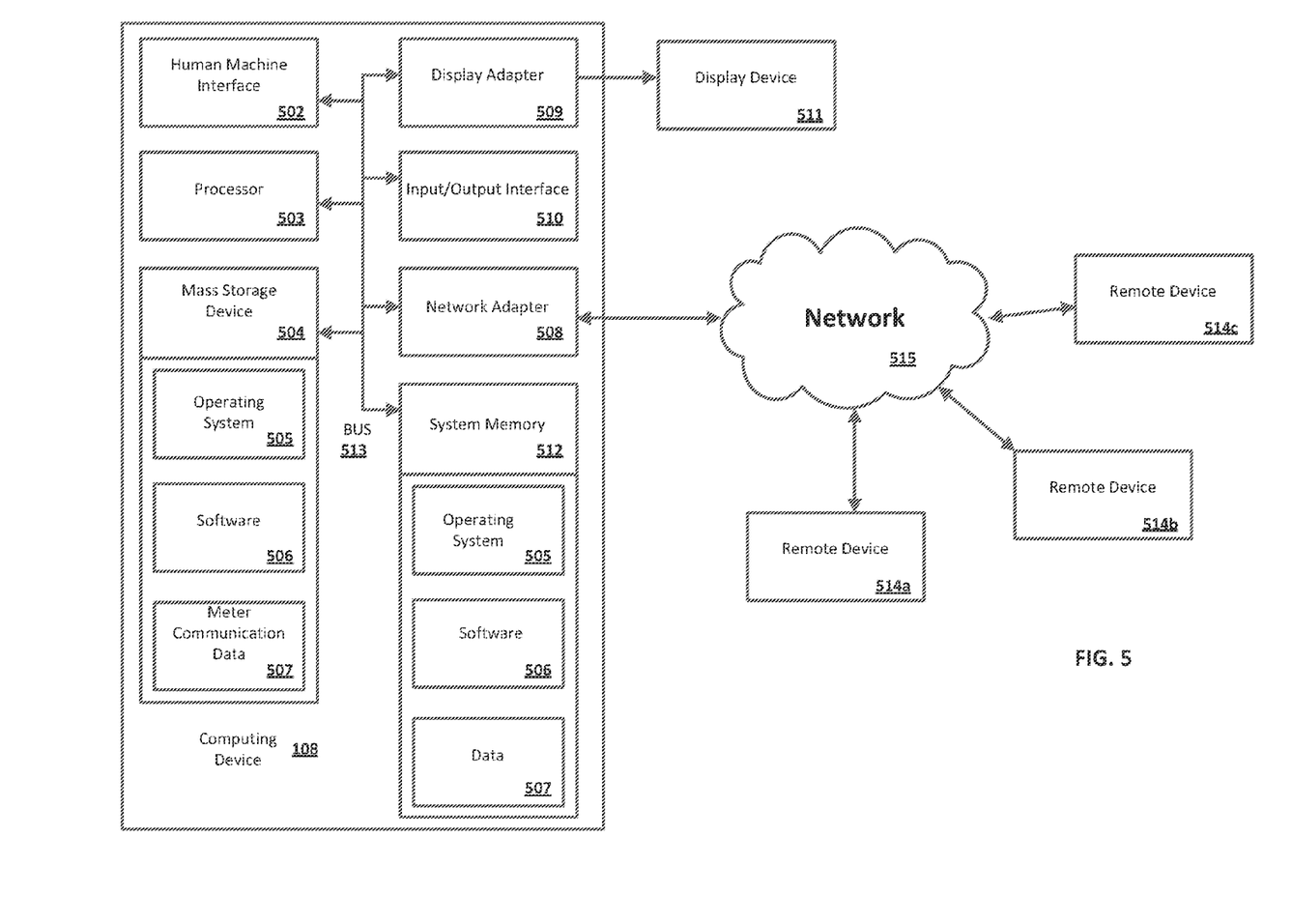
FIG. 5 is a block diagram illustrating an exemplary operating environment for performing aspects of the disclosed methods.

The above system has been described above as comprised of units. One skilled in the art will appreciate that this is a functional description and that software, hardware, or a combination of software and hardware can perform the respective functions. A unit, such as a smart appliance or device, a smart meter, a smart grid, a utility computing device, a vendor or manufacturer's computing device, etc., can be software, hardware, or a combination of software and hardware. The units can comprise software 506 such as, for example, DRMS software as illustrated in FIG. 5 and described below. In one exemplary aspect, the units can comprise a computing device 108 as illustrated in FIG. 5 and described below.

FIG. 5 is a block diagram illustrating an exemplary operating environment for performing aspects of the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, smart meters, smart-grid components, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 108. The components of the computer 108 can comprise, but are not limited to, one or more processors or processing units 503, a system memory 512, and a system bus 513 that couples various system components including the processor 503 to the system memory 512. In the case of multiple processing units 503, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the processor 503, a mass storage device 504, an operating system 505, software 506, data 507, a network adapter 508, system memory 512, an Input/Output Interface 510, a display adapter 509, a display device 511, and a human machine interface 502, can be contained within one or more remote devices 514a,b,c such as remote computing devices or clients at physically separate locations, connected through buses of this form, in effect implementing a fully distributed system or distributed architecture.

The computer 108 typically comprises a variety of computer readable media. Exemplary readable media can be any available media that is non-transitory and accessible by the computer 108 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as data 507 and/or program modules such as operating system 505 and software 506 that are immediately accessible to and/or are presently operated on by the processing unit 503.

In another aspect, the computer 108 can also comprise other non-transitory, removable/non-removable, volatile/non-volatile computer storage media. By way of example, FIG. 5 illustrates a mass storage device 504 that can provide non-volatile storage of computer code, computer readable instructions, data structures, program modules, and other data for the computer 108. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and software 506. Each of the operating system 505 and software 506 (or some combination thereof) can comprise elements of the programming and the software 506. Data 507 can also be stored on the mass storage device 504. Data 507 can be stored in any of one or more databases known in the art. Examples of such databases comprise, DB2® (IBM Corporation, Armonk, N.Y.), Microsoft® Access, Microsoft® SQL Server, (Microsoft Corporation, Bellevue, Wash.), Oracle®, (Oracle Corporation, Redwood Shores, Calif.), mySQL, PostgreSQL, and the like. The databases can be centralized or distributed across multiple systems.

In another aspect, the user can enter commands and information into the computer 108 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 108 can have more than one display adapter 509 and the computer 108 can have more than one display device 511. For example, a display device can be a monitor, an LCD (Liquid Crystal Display), or a projector. In addition to the display device 511, other output peripheral devices can comprise components such as speakers (not shown) and a printer (not shown), which can be connected to the computer 108 via Input/Output Interface 510. Any step and/or result of the methods can be output in any form to an output device. Such output can be any form of visual representation, including, but not limited to, textual, graphical, animation, audio, tactile, and the like.

The computer 108 can operate in a networked environment using logical connections to one or more remote devices 514a,b,c. By way of example, a remote device 514 can be a personal computer, portable computer, a server, a router, a network computer, a smart meter, a vendor or manufacture's computing device, smart grid components, a peer device or other common network node, a communications gateway, and so on. Logical connections between the computer 108 and a remote device 514a,b,c can be made via a local area network (LAN) and a general wide area network (WAN). Such network connections can be through a network adapter 508. A network adapter 508 can be implemented in both wired and wireless environments. Such networking environments are conventional and commonplace in offices, enterprise-wide computer networks, intranets, and other networks 515 such as the Internet or an AMI network.

For purposes of illustration, application programs and other executable program components such as the operating system 505 are illustrated herein as discrete blocks, although it is recognized that such programs and components reside at various times in different storage components of the computing device 108, and are executed by the data processor(s) of the computer. An implementation of software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving, by a first device, information communicated from one or more first networks, wherein the first device is a low power device; and
transmitting, by a second device, at least part of the information over a second network, wherein the second device is a high power device and wherein the first device and the second device are located within an electrical meter used to meter a first power source and said first device and second device receive power from a single power supply connected to an electrical power source separate from the first power source.

2. The method of claim 1, wherein the one or more first networks comprise home-area networks (HANs).

3. The method of claim 2, wherein the HANs utilize one or more of an IEEE Standard 802.15.n (Zigbee), 802.11n (WiFi), power line carrier (PLC), or broadband over power line (BPL) when communicating with the first device.

4. The method of claim 1, wherein second network comprises an advanced metering infrastructure (AMI) network.

5. The method of claim 1, wherein the electrical power source separate from the first power source comprises electrical power wiring accompanying a wired communications system and the wired communications system comprises one of a cable television system, a cable Internet system or a telephone system.

6. The method of claim 1, wherein the first device comprises a wireless receiver.

7. The method of claim 6, wherein the wireless receiver comprises an IEEE Standard 802.15.n (Zigbee) receiver.

8. The method of claim 1, wherein the first device comprises a wireless transceiver.

9. The method of claim 1, wherein the second device comprises a wireless advanced metering infrastructure (AMI) radio transceiver.

10. The method of claim 1 further comprising:
receiving, by the second device, instructions via the second network; and
transmitting, by the first device, at least part of the instructions to one or more of the one or more first networks.

11. The method of claim 1, wherein the first device is low power relative to a received or transmitted signal strength to the high power second device.

12. A communications gateway comprised of:
a first device, wherein the first device is configured to transmit or receive information over one or more first networks and said first device is a low power device;
a second device, wherein the second device is configured to transmit or receive information over a second network and said second device is a high power device;
a processor, wherein the processor is operably connected to the first device and the second device and the processor is configured to process the information received or transmitted by the first or second devices; and
a single power supply, wherein the first device, the second device, the processor and the single power supply are located within an electrical meter used to meter a first power source and said first device, second device and processor receive power from the single power supply connected to an electrical power source separate from the first power source.

13. The system of claim 12, wherein the one or more first networks comprise home-area networks (HANs).

14. The communications gateway of claim 13, wherein the HANs utilize one or more of an IEEE Standard 802.15.n (Zigbee), 802.11n (WiFi), power line carrier (PLC), or broadband over power line (BPL) when communicating with the first device.

15. The communications gateway of claim 12, wherein second network comprises an advanced metering infrastructure (AMI) network.

16. The communications gateway of claim 12, wherein the electrical power source separate from the first power source comprises electrical power wiring accompanying a wired communications system and the wired communications system comprises one of a cable television system, a cable Internet system or a telephone system.

17. The communications gateway of claim 12, wherein the first device comprises a wireless receiver.

18. The communications gateway of claim 17, wherein the wireless receiver comprises an IEEE Standard 802.15.n (Zigbee) receiver.

19. The communications gateway of claim 12, wherein the second device comprises a wireless transceiver.

20. The communications gateway of claim 12, wherein the second device comprises a wireless advanced metering infrastructure (AMI) radio transceiver.

21. The communications gateway of claim 12, wherein the communications gateway is configured to:
receive, by the second device, instructions via the second network;
process the instructions using the processor, and
transmit, by the first device, at least part of the instructions to one or more of the one or more first networks.

22. The communications gateway of claim 12, wherein the communications gateway is configured to:
receive, by the first device, information communicated by one or more of the one or more first networks;
process the information using the processor, and
transmit, by the second device, at least part of the information to the second network.

23. The communications gateway of claim 12, wherein the first device is low power relative to a received or transmitted signal strength to the high power second device.

24. A communications gateway comprised of:
a wireless IEEE Standard 802.15.n (Zigbee) low power transceiver, wherein the Zigbee transceiver is configured to transmit or receive information over one or more home-area networks (HANs);
an advanced metering infrastructure (AMI) high power transceiver, wherein the AMI transceiver is configured to transmit or receive information over an AMI network;
a processor, wherein the processor is operably connected to the Zigbee transceiver and the AMI transceiver and the processor is configured to process the information received or transmitted by the Zigbee transceiver or AMI transceiver; and
a single power supply, wherein the Zigbee transceiver, the AMI transceiver, the processor and the single power supply are located within an electrical meter used to meter a first power source and said Zigbee transceiver, AMI transceiver and processor receive power from the single power supply connected to an electrical power source separate from the first power source.

25. The communications gateway of claim 24, wherein the electrical power source separate from the first power source comprises electrical power wiring accompanying a wired communications system and the wired communications system comprises one of a cable television system, a cable Internet system or a telephone system.

26. A method comprising:
measuring consumption of a commodity;
transmitting consumption data using a low power transmitter;
receiving the consumption data from the low power transmitter; and
transmitting the consumption data using a high power transmitter, wherein the low power transmitter and the high power transmitter are located within an electrical meter used to meter a first power source and said low power transmitter and high power transmitter receive power from a single power supply connected to an electrical power source separate from the first power source.

27. The method of claim 26, wherein the low power transmitter comprises one of an IEEE Standard 802.15.n (Zigbee) or 802.11n (WiFi) transmitter.

28. The method of claim 26, wherein high power transmitter comprises an advanced metering infrastructure (AMI) transmitter, power line carrier (PLC) transmitter, or broadband over power line (BPL) transmitter.

29. The method of claim 26, wherein the electrical power source separate from the first power source comprises electrical power wiring accompanying a wired communications system and the wired communications system comprises one of a cable television system, a cable Internet system or a telephone system.

30. The method of claim 26, wherein the low power transmitter is low power relative to a received or transmitted signal strength to the high power transmitter.

\* \* \* \* \*